A. SCHAEFER.
APPARATUS FOR RECOVERING VOLATILE AND FERMENTABLE MATTER FROM LIQUIDS.
APPLICATION FILED JAN. 25, 1917.
1,342,721.
Patented June 8, 1920.
4 SHEETS—SHEET 4.
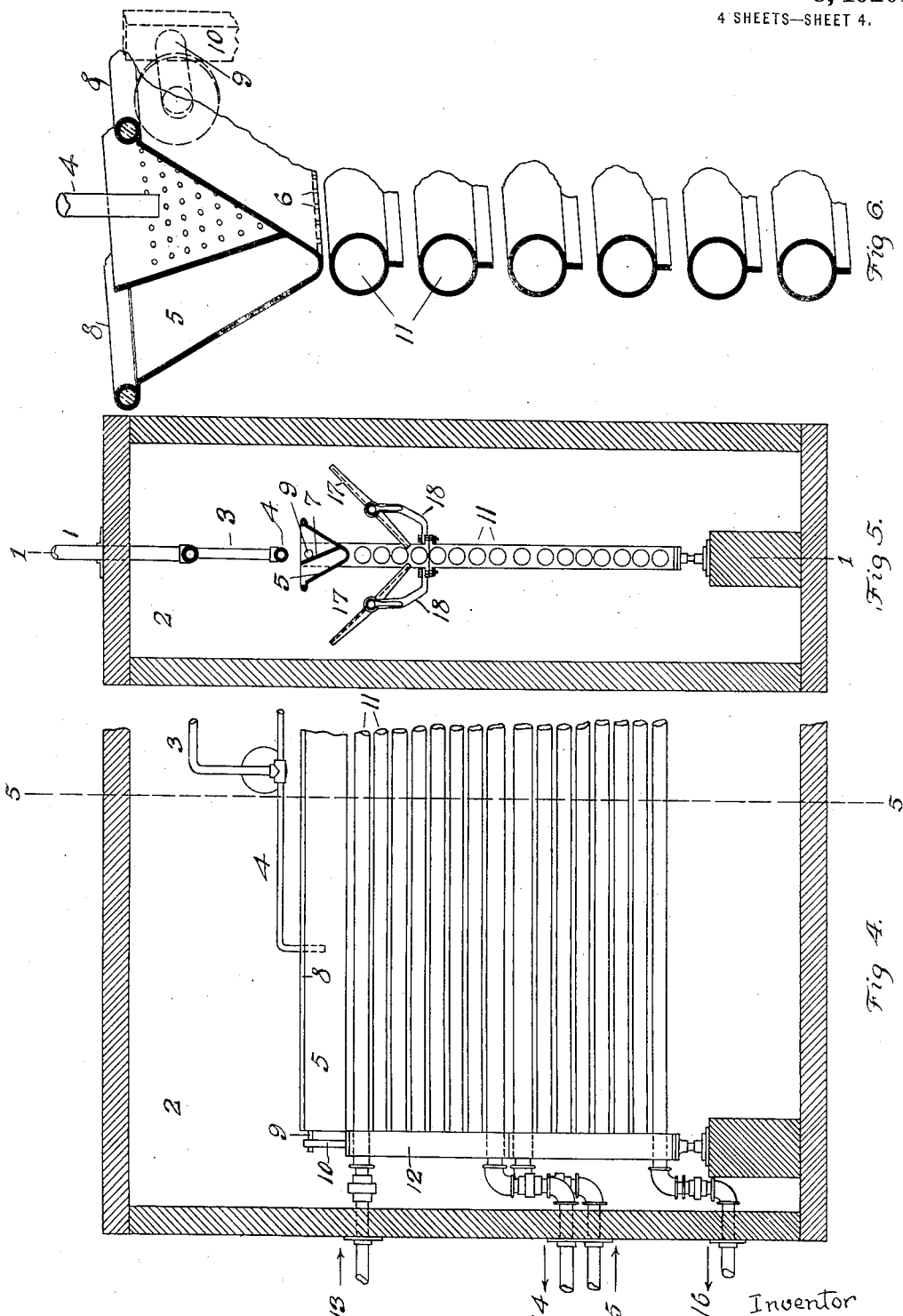
Inventor
August Schaefer
by
Attorney.

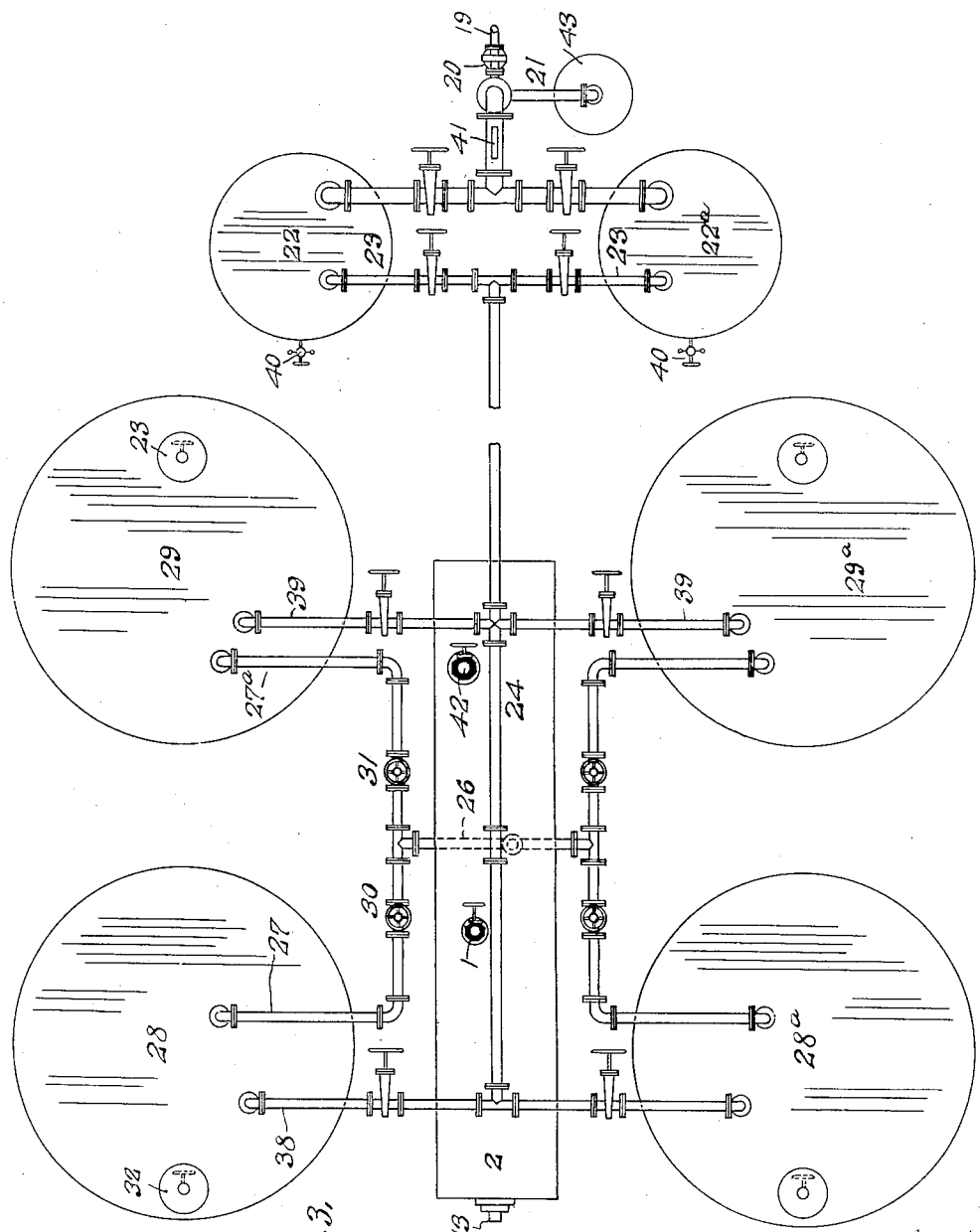

ated on large quantities of other liquids for separating the volatile matters therein held in solution.

UNITED STATES PATENT OFFICE.

AUGUST SCHAEFER, OF PORTLAND, OREGON, ASSIGNOR TO NORTHWEST PROCESS COMPANY, OF PORTLAND, OREGON, A CORPORATION OF OREGON.

APPARATUS FOR RECOVERING VOLATILE AND FERMENTABLE MATTER FROM LIQUIDS.

1,342,721.   Specification of Letters Patent.   Patented June 8, 1920.

Application filed January 25, 1917. Serial No. 144,570.

*To all whom it may concern:*

Be it known that I, AUGUST SCHAEFER, a citizen of the United States, and a resident of the city of Portland, county of Multnomah, State of Oregon, have invented a certain new and useful Improvement in Apparatus for Recovering Volatile and Fermentable Matter from Liquids, of which the following is a specification.

My invention relates specifically to the recovery of volatile and fermentable matter from the waste liquor discharged by the digesters of paper mills using the sulfite process, and has for its object the providing of an efficient apparatus by which this work can be commercially done.

I attain this object in the apparatus hereinafter described which is adapted and arranged to carry on the work continuously, with large quantities of sulfite liquor in the following manner:

My apparatus is located close to the digester, so that the heat inherent in the waste liquor as discharged from the "blow pit" may be conserved, and the liquor delivered to the volatilizing chamber of the apparatus at approximately that temperature at which it must be placed in order to volatilize the sulfur dioxid. In the volatilizing chamber the liquor is distributed by suitable means in the form of a thin sheet or film over a large, heated surface, thereby maintaining the temperature of the liquor at the point required for volatilizing the sulfur dioxid in a partial vacuum; the work being necessarily carried on under partial vacuum in order to vaporize only a small per cent. of the water while volatilizing a large per cent. of the sulfur dioxid. The latter is recovered by being drawn into a watery solution. The residue liquor is neutralized for fermentation. Furthermore, in order to carry on the work on a large scale my apparatus is arranged in the form of independent units, which may be thrown into and cut out of service by the mere adjustment of valves; and the apparatus being further so arranged that the work may be continuously carried on by changing from one unit to another, and that either unit may be cut out without breaking the vacuum in the rest of the apparatus.

My apparatus is also adapted for operating on large quantities of other liquids for separating the volatile matters therein held in solution.

In the accompanying drawings:

Fig. 3 is a diagrammatic plan view, illustrating the collocation of the different parts;

Fig. 4 is a fragmental elevation, on a larger scale, of the left-end portion of the evaporating chamber of my apparatus (as shown in Fig. 1) and devices therein installed;

Fig. 5 is a diagrammatic transverse section taken on the line 5—5 of Fig. 4, and on the same scale as the latter; and Fig. 6 shows in perspective section, and on a still larger scale, certain details of construction of the distributer and the heating coil of my apparatus.

Figure 1:
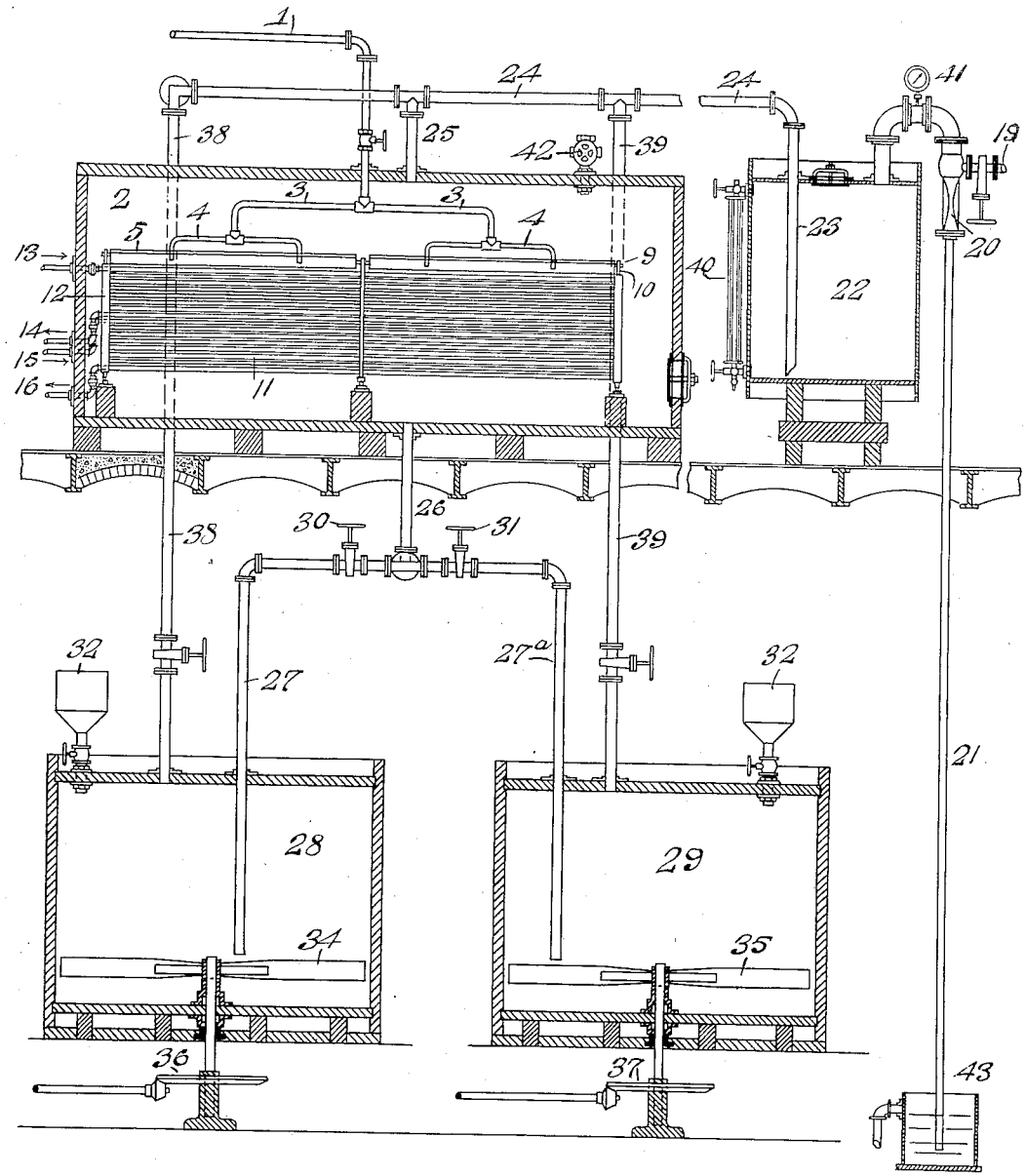
Figure 1 is a diagrammatic, longitudinal, vertical section of my apparatus illustrating the arrangement of its parts.

The waste liquor, as discharged from the "blow pit" of the digester, is led through a carrier or valve-controlled pipe 1, into the evaporating chamber 2; the pipe 1 having branches 3 and distributing terminals 4, which conduct the liquor into a distributer 5, having perforations 6 at the bottom, and provided with a strainer 7 to strain out the solid matters in the liquor. The distributer 5 has reinforced rims 8 and it is supported by arms 9 on posts 10.

The liquor flows from the bottom of the distributer 5 in a very thin sheet, or film, over both sides of a series of vertically stacked coils of pipes 11, which are connected with a steam header 12; the steam flowing from a boiler (not shown) through pipe 13, through the uppermost of said coils, then down and escaping through exhaust 14; also through intake 15 and outlet 16. Aprons 17, laterally disposed, as shown in Fig. 5, are provided to catch any overflow from the distributer 5, and also the splashings incidental to a too rapid discharge from the bottom of the latter. The aprons 17 are adjustably supported by arm 18. The coils 11, as a whole, constitute a heating surface of sufficient area for maintaining the temperature of the thin sheet of liquor, flowing over both sides thereof, at approximately 180 to 190 degrees Fahrenheit, for the purpose of removing the sulfur dioxid from the liquor either by oxidation of gasification. This step of my process is facilitated and promoted by means of a vacuum of approximately 5 to 8 inches, created by a jet pump of the type known as a "barometric condenser," in the evaporating chamber 2. The "barometric condenser" is connected by a valve-controlled pipe 19 with a source of water, so that upon opening the valve the water will flow through the contraction 20 down the pipe 21, in so doing drawing in and condensing the aqueous vapors from the saturation tank 22, and in this way creating a partial vacuum in the apparatus. The pipe 21 discharges in a trap or hot well 43. The upper end of the pipe 21 is connected to the top of a closed saturation tank 22, which in practice is partially filled with water or other solvent. Into the saturation tank 22 leads the branch 23 of a pipe 24, the latter also having a branch 25 connected with the top of the evaporation chamber 2. In this way the gaseous dioxid of sulfur is drawn from the chamber 2 into the solution in said saturation tank 22. The rest of the liquor, being the main bulk of the original waste liquor, escapes through a pipe 26 in the floor of the chamber 2 and thence passes through branches 27, 27ᵃ into either of the residuum chambers 28, 29, as determined by the adjustment of the valves 30, 31 of the pipes 27, 27ᵃ. In the residuum chambers 28, 29, the acids are neutralized by some suitable neutralizing agent introduced through the valved hoppers 32, 33. To facilitate the thorough neutralization of the liquor in the chambers 28, 29, I provide therein an agitator 34, 35, which is driven by any suitable power connection, for example, such as diagrammatically illustrated at 36, 37. The chambers 28 and 29 are connected by means of the valved pipes 38 and 39 with the pipes 24, and are thus also under said vacuum, the purpose of which is to carry away any remaining sulfur dioxid from the chambers 28, 29, into the saturation tank 22; and, furthermore, the chambers 28, 29, must, of course, be under the same vacuum as the chamber 2, otherwise the liquors could not flow from the latter into the former.

The liquor collected in the chambers 28, 29, after neutralization and cooling, is conveyed in any convenient way to the fermentation tanks (not shown), for fermentation and production of alcohol, and such other uses as may appear.

40 represents a water glass, and 41 a pressure gage.

The evaporation chambers 2 should be made of acid-resisting material; I prefer to use wood of sufficient strength, properly jointed and reinforced.

Figure 2:
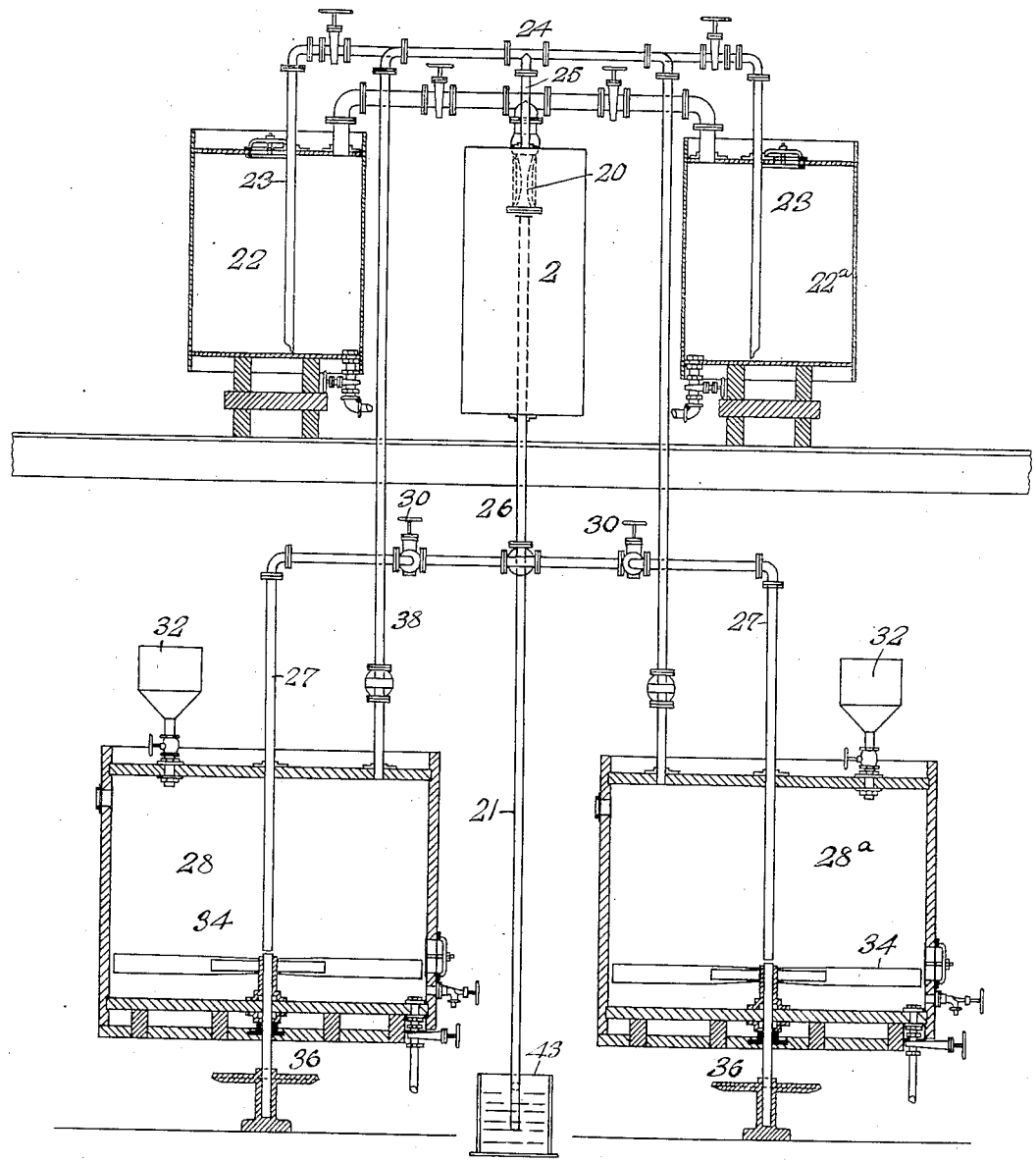
Fig. 2 is a diagrammatic transverse section, illustrating the connections between different parts of my apparatus.

In order to arrange for the carrying on of my process in a continuous manner, and on a very large scale, my apparatus is arranged in the form of independent units, I provide a number of saturation tanks, as indicated in Figs. 2 and 3, by 22, 22ᵃ, and of the residuum chambers, as indicated in the same figures by 28, 29, and 28ᵃ, 29ᵃ; and the pipe 24 and its branches leading to said saturation tanks 22, 22ᵃ, and said residuum chambers 28, 29, 28ᵃ, 29ᵃ are correspondingly arranged.

Thus either of the saturation tanks 22, 22ᵃ, and, likewise, either of the residuum chambers 28, 29, 28ᵃ, 29ᵃ, may be cut out, as it were, from the rest of the apparatus by a mere adjustment of the valves controlling the branch pipes leading into said chambers; and the liquors contained in the saturation tank or residuum chamber so cut out may then be drawn off without breaking the vacuum in the rest of the apparatus. 42 is a valved air pipe.

I claim—

1. In an apparatus for recovering volatile and fermentable matter from liquids, an evaporating chamber, a vertically stacked coil of pipes in said evaporating chamber, a perforated distributer extending over the top of said coil of pipes, a strainer in such distributer, means for heating said coil of pipes, a residuum chamber, a valved pipe discharging from the evaporating chamber into the residuum chamber, a saturation tank, a vacuum creating device connected with the saturation tank, and a passageway between the latter and said evaporating chamber.

2. In an apparatus for recovering volatile and fermentable matter from liquids, an evaporating chamber, a vertically stacked coil of pipes in said evaporating chamber, a perforated distributer extending over the top of said coil of pipes, means for heating said coil of pipes, a residuum chamber, a valved pipe discharging from the evaporating chamber into the residuum chamber, an agitator in said residuum chamber, a saturation tank, a vacuum creating device connected with the saturation tank, and a valved pipe connecting the latter with said evaporating chamber.

3. In an apparatus for recovering volatile and fermentable matter from liquids, an evaporating chamber, a vertically stacked coil of pipes in said evaporating chamber, a perforated distributer extending over the top of said coil of pipes, means for heating said coil of pipes, a residuum chamber, an outlet from the evaporating chamber into said residuum chamber, a valve-controlled hopper for said residuum chamber, an agitator in said residuum chamber, a saturation tank, a vacuum creating device connected with the saturation tank, and a valved pipe connecting the latter with said evaporating chamber.

4. In an apparatus for recovering volatile and fermentable matter from liquids, an evaporating chamber, a vertically stacked coil of pipes in said evaporating chamber, a perforated distributer extending over the top of said coil of pipes, a strainer in such distributer, a saturation tank, a vacuum creating device connected with the saturation tank, and a passageway between the latter and said evaporating chamber.

5. An apparatus for recovering volatile and fermentable matter from liquids, comprising a conduit for receiving the hot waste-liquor of a digester, a vacuum chamber into which said conduit leads, the latter being provided with distributing branches within said vacuum chamber, an absorption tank connected with the upper portion of said vacuum chamber, an air-pump connected with said absorption tank, a plurality of settling tanks, connections between said vacuum chamber and said settling tanks, and also between the latter and the absorption tank, and valves controlling said respective connections.

6. An apparatus for recovering volatile and fermentable matter from liquids, comprising a conduit for receiving the hot waste-liquor of a digester, a vacuum chamber into which said conduit leads, the latter being provided with distributing branches within said vacuum chamber, an absorption tank connected with the upper portion of said vacuum chamber, an air-pump connected with said absorption tank, a plurality of settling tanks, connections between said vacuum chamber and said settling tanks, and also between the latter and the absorption tank, valves controlling said respective connections, and agitators in said settling tanks.

7. In an apparatus for recovering volatile and fermentable matter from liquids, a conduit for receiving the hot waste-liquor of a digester, a vacuum chamber into which said conduit leads, the latter being provided with distributing branches within said vacuum chamber, a plurality of absorption tanks, connections between the upper portion of said vacuum chamber and said absorption tanks, an air pump connected with said absorption tanks, a plurality of settling tanks, connections between said vacuum chamber and said settling tanks, and also between the latter and said absorption tanks, valves controlling said respective connections, and agitators in said settling tanks.

8. An apparatus for recovering volatile and fermentable matter from liquids, comprising a conduit, a vacuum chamber into which the conduit leads, a heater within the vacuum chamber, comprising horizontal, vertically alined coils close together, a trough-like perforate distributer into which said conduit discharges, said distributer being adapted to distribute the liquid onto the upper coil of said heater in the form of a thin sheet or film, an absorption tank connected with said vacuum chamber, an air pump connected with said absorption tank, a settling tank, and a connection between the latter and said vacuum chamber.

AUGUST SCHAEFER.